No. 881,906. PATENTED MAR. 17, 1908.
J. CULLEN.
POULTRY FOUNTAIN.
APPLICATION FILED DEC. 5, 1907.

2 SHEETS—SHEET 1.

Witnesses
Geo L Strom
E. L. Chandler

Inventor
John Cullen.
By Woodward & Chandler
Attorneys

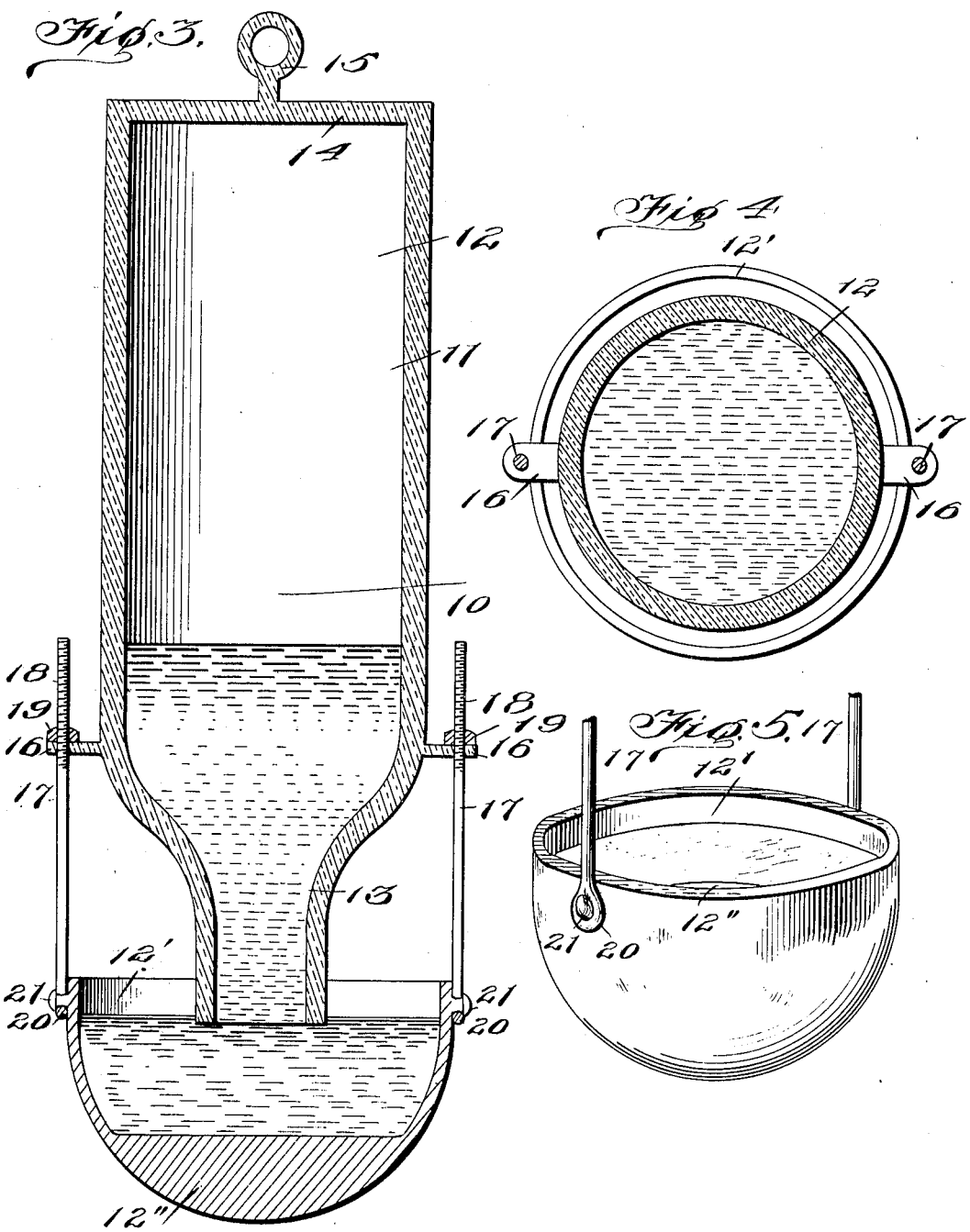

UNITED STATES PATENT OFFICE.

JOHN CULLEN, OF McGIRK, MISSOURI.

POULTRY-FOUNTAIN.

No. 881,906.  Specification of Letters Patent.  Patented March 17, 1908.

Application filed December 5, 1907. Serial No. 405,212.

*To all whom it may concern:*

Be it known that I, JOHN CULLEN, a citizen of the United States, residing at McGirk, in the county of Moniteau and State of Missouri, have invented certain new and useful Improvements in Poultry-Fountains, of which the following is a specification.

This invention relates to care of live stock, and more particularly to drinking fountains, and has for its object to provide a fountain which may be manufactured at a relatively low figure and which will be automatic when in use.

A further object of this invention is to provide a fountain of this character with a reservoir attachment whereby water may be supplied to a trough automatically and which will be so constructed as to avoid the usual drowning of small chickens or other young poultry.

Other objects and advantages will be apparent from the following description and it will be understood that changes in the specific structure shown and described may be made within the scope of the claims without departing from the spirit of the invention.

Figure 1:
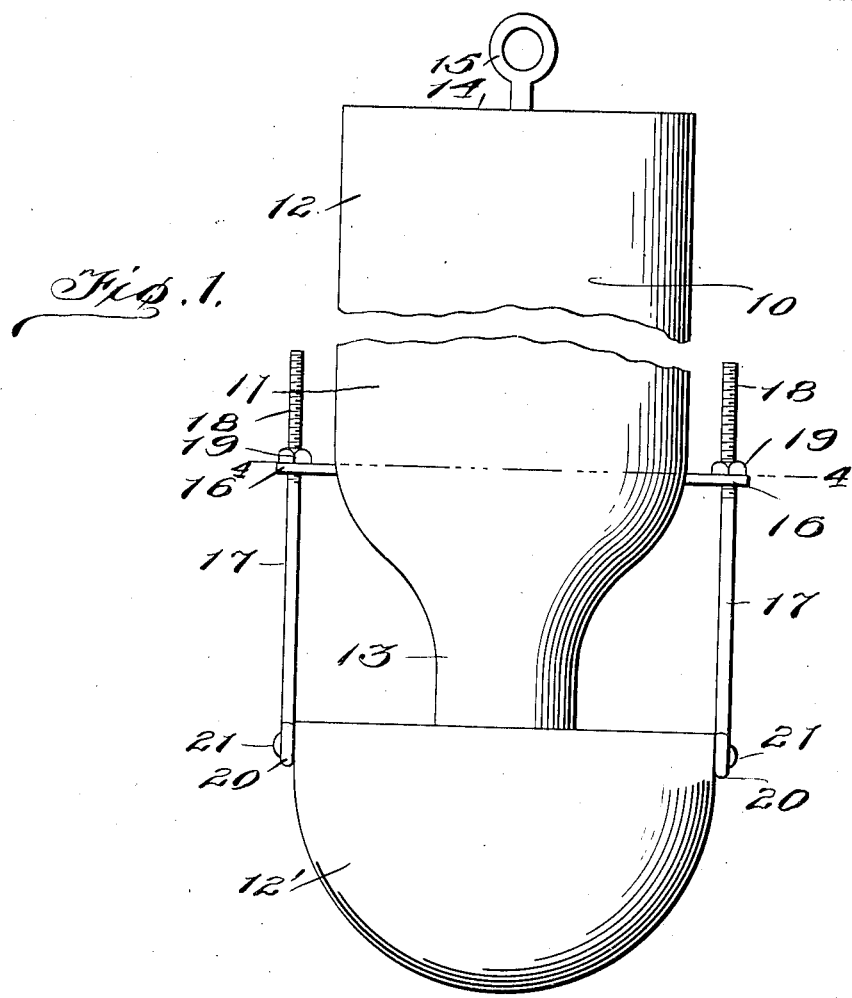
Figure 2:
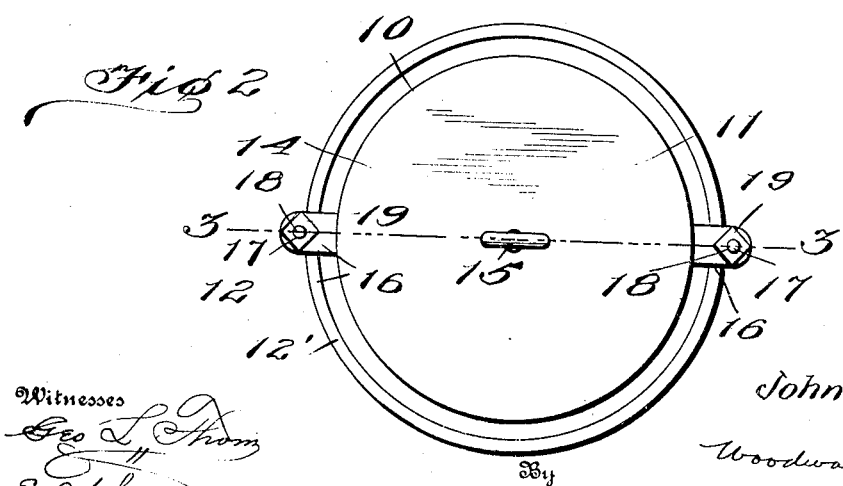

In the drawings forming a portion of this specification, and in which like numerals of reference indicate similar parts in the several views, Figure 1 is a front elevational view of the fountain, Fig. 2 is a top plan view, Fig. 3 is a vertical sectional view taken on the line 3—3 of Fig. 2, Fig. 4 is a horizontal sectional view taken on the line 4—4 of Fig. 1, Fig. 5 is a detail perspective view of the trough.

Referring now to the drawings, there is shown a poultry fountain 10, which comprises a reservoir 11, and a trough 12'. The reservoir 11 is preferably formed of crockery, glass, or other like material and consists of an elongated cylindrical portion 12, and a contracted and elongated neck 13. The one end of the portion 12 of the reservoir is closed as shown at 14, and secured in this portion, there is shown an eye 15 which projects outwardly from the closed portion and is thus arranged to support the reservoir in an elevated position by engagement with a suitable supporting hook, not shown. Laterally extending guide loops 16 are carried by the reservoir 11 and slidably arranged within these loops there are shown vertically extending rods 17. The rods 17 have their upper ends threaded as shown at 18, and nuts 19 are engaged upon these threaded portions of the rod, for a purpose to be hereinafter described. The lower ends of the rod 17 are bent to form eyes 20, and these eyes are arranged for engagement with studs 21 which project from the walls of the trough 12'.

It may be stated, that the pivotal movement of the rod 17 with respect to the trough 12' is such as to enable the reservoir to be swung at an angle to partly invert the reservoir when it is desired to fill the same. After the reservoir 11 has been filled, the trough 12' is disposed with its bottom 12" closing the neck 13 of the reservoir 11, and it will be seen that this movement of the trough is accomplished by the sliding movement of the rods 17' which are slidable in the guides 16, and it will be seen that the threaded outer ends of the rods 17, and the nuts 19 are thus arranged to hold the bottom 12" of the trough 12' tightly against the open end of the neck 13 when not in use.

When it is desired to use the fountain, the eye 15 which is carried by the reservoir 11 is engaged with a suitable hook, and the reservoir 12 is adjusted by means of the nuts 19 to bring the lower portion of the neck 13 in proper spaced relation to the bottom 12" of the trough 12', whereupon, the liquid within the reservoir will be free to flow to the trough 12', and it will be seen that a liquid will remain in the trough 12 as long as there is a liquid in the reservoir.

What is claimed is:

1. A poultry fountain comprising a reservoir, the reservoir having an elongated cylindrical portion and a contracted neck, guides carried by the reservoir, rods slidably engaged in the guides, a trough carried by the rods, and means carried by said rods for holding the trough with its bottom spaced from the neck.

2. A drinking fountain comprising a reservoir, the reservoir having guides formed integral therewith, threaded rods slidably arranged in the guides, clamping nuts carried by the rods and arranged for engagement with the guides, and a trough carried by the rods and arranged in communication with the reservoir.

In testimony whereof I affix my signature, in presence of two witnesses.

JOHN CULLEN

Witnesses:
JOHN F. KIRCHHOFF,
V. B. BEAM.